United States Patent
O'Connell et al.

[19]

[11] Patent Number: 5,848,360
[45] Date of Patent: *Dec. 8, 1998

[54] METHOD AND APPARATUS FOR PROGRAMMING A RADIO TELEPHONE

[75] Inventors: Donal Joseph O'Connell, Hampshire; Alan Charles Grimmett, Surrey, both of England

[73] Assignee: Nokia Mobile Phones Limited, Salo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 566,789

[22] Filed: Dec. 4, 1995

[30] Foreign Application Priority Data

Dec. 12, 1994 [GB] United Kingdom .................... 9425185

[51] Int. Cl.⁶ ........................................................ H04Q 7/32
[52] U.S. Cl. ............................................ 455/551; 455/418
[58] Field of Search ................................ 455/418, 419, 455/551, 550, 403

[56] References Cited

U.S. PATENT DOCUMENTS

| | | | |
|---|---|---|---|
| 5,297,192 | 3/1994 | Gerszberg | 455/551 |
| 5,315,638 | 5/1994 | Mukari | 379/58 |
| 5,353,328 | 10/1994 | Jokimies | 378/58 |
| 5,448,622 | 9/1995 | Huttunen | 379/58 |
| 5,485,505 | 1/1996 | Norman et al. | 455/551 |
| 5,495,518 | 2/1996 | Hayashi | 455/418 |
| 5,524,276 | 6/1996 | Littig et al. | 455/551 |
| 5,581,803 | 12/1996 | Grube et al. | 455/551 |

FOREIGN PATENT DOCUMENTS

| | | |
|---|---|---|
| 0468790 | 1/1992 | European Pat. Off. . |
| 2249459 | 5/1992 | United Kingdom . |
| WO 87/01537 | 3/1987 | WIPO . |

*Primary Examiner*—Dwayne D. Bost
*Assistant Examiner*—William G. Trost
*Attorney, Agent, or Firm*—Perman & Green, LLP

[57] ABSTRACT

A method for storing identification data in a Number Assignment Module of a radio telephone. The radio telephone includes a NAM module that is preconditioned to accept NAM data entered with a particular protocol.

20 Claims, 3 Drawing Sheets

METHOD AND APPARATUS FOR PROGRAMMING A RADIO TELEPHONE

BACKGROUND OF THE INVENTION

The invention relates to conditioning a radio telephone with unique identification information.

Before a radio telephone bought off-the-shelf is fully functional it is necessary for the purchaser to sign up with a service provider. Although a telephone is manufactured with a unique Electronic Serial Number ESN, in order to connect to a radio telephone system of the purchasers choice (eg Cellnet or Vodaphone in the UK), the radio telephone must be provided with sufficient information to identify the radio telephone user and the system to which it is connected. This information is provided in the Number Assignment Module (NAM) information.

It is noted that the terms 'Number Assignment Module' and 'NAM' as used herein encompass any memory means, not necessarily modular in form, nor dedicated to the NAM function, in which information pertaining to the identity of the telephone, specifically the telephone number, is stored.

The NAM information includes a Mobile Identification Number (MIN) which is basically the telephone number of the radio telephone. This number also indicates the Access Overload Class (ACOL). In addition to the MIN, the NAM includes security data used during registration to confirm the identity of the radio telephone and System Identification Data (SID) providing details of a 'Home Traffic Area' and 'System Control Channels'. The radio telephone uses the NAM information along with its ESN to gain access to the chosen radio telephone system.

It is highly desirable for the process of conditioning a radio telephone with its own unique identifying information to be as simple as possible so that there is as little delay in the sales process as possible. In order to ensure that the phone is ready for use when it leaves the store, the sales assistant is required to enter the relevant data into the telephone. It is not generally possible for the purchaser to enter the NAM information as a password, ideally not widely available, is needed to access the NAM. In addition, the process is relatively complicated. The data is obtained from the chosen service provider by telephone and is usually entered through the key pad of the radio telephone. If the password is correctly entered the assistant must input each of the fields of the NAM data in a predetermined sequence. As the process is relatively complicated sales assistants dealing with a variety of products and perhaps selling only one telephone every few days will have to be constantly reminded of how to programme the information into the telephone with the attendant possibilities for error. One consequence of all this is that the purchaser may have to return to the retailer a few hours after the purchase is completed to collect the fully operational telephone. This is clearly not desirable.

SUMMARY OF THE INVENTION

In accordance with a first aspect of the invention there is provided a method for conditioning a Number Assignment Module (NAM) for a radio telephone with identification data comprising the steps: storing a predetermined code at a predetermined location in the NAM; determining if the predetermined code is stored at the predetermined NAM location; and replacing the predetermined code with identification data conditional on the result of the determination.

In accordance with a second aspect of the invention there is provided a radio telephone comprising: a Number Assignment Module (NAM) in which is stored a predetermined code at a predetermined location; means for determining if the predetermined code is stored at the predetermined location; and replacing means responsive to the means for determining for replacing the predetermined code with identification data.

In order to allow, for example, emergency numbers to be made using a radio telephone that has not yet obtained its own unique identity, a factory default NAM is provided. For this invention, at least part of the factory default NAM, typically the MIN, can also be used as a flag to indicate that the radio telephone does not yet have its own unique identity. In effect the factory default MIN provides the password that allows the telephone to be conditioned with user specific NAM data.

By using the NAM itself to hold the password that allows the NAM data to be stored in the NAM, the number of key presses required by the sales assistant or other person entering the NAM data is reduced. There is no need to enter a password or other code correctly and the person entering the NAM information need only enter that information directly relevant to the NAM. The reduced number of keystrokes both speeds up the process and reduces the likelihood of error. The simplicity of the process makes it feasible for purchasers themselves to be able to store the identification information in the NAM particularly as no password is necessary.

Preferably the replacing means comprises means for determining if a sequence of key presses provides data indicative of NAM data. The replacement of the predetermined code with NAM data is additionally conditional on the sequence of key presses entered corresponding with the sequence of key presses for entering NAM data.

By providing means by which a sequence of key presses indicative of NAM data can be determined, the telephone can be used for other purposes before the identification information is stored in the NAM. If, for example, the identification data is to be stored in the NAM by the purchasers themselves it is preferable for the phone to be usable for specific purposes, eg. entering automatic dialling information, accessing menu functions and dialling emergency numbers before the individual NAM information has been obtained. It may also be desirable for the phone to be able to make a call to the service provider in order to obtain the NAM data in the first instance.

In a preferred embodiment the NAM data is entered in two parts and a non-numeric key, suitably the asterisk key, is pressed to separate the two parts. This keeps the number of key presses required to enter the NAM data to a minimum while providing means by which the radio telephone can determine that NAM data is being entered. Other suitable protocols for the entry of NAM data could, however, be used instead.

In order to reduce further the chance of error in inputting data, the telephone preferably provides means for verifying the accuracy of the entered NAM data. This may take the form of means for generating a check derived from digits entered in the sequence of key presses. The check may be a number. This may be displayed on the LCD of the radio telephone or could be sent over the air for remote verification.

If verification takes place at a location remote from the radio telephone, an over-the-air signal received by the radio telephone may be used to trigger replacement of the default NAM with the identification data entered.

In order to reduce the number of key presses necessary to impart all the NAM information to the radio telephone the key presses are preferably used to provide data for the two most important fields in the NAM ie the Mobile Identification Number (MIN) and the System Identification Number (SID). Other fields of the NAM can be derived from the data in the MIN and SID fields and/or set as defaults.

The unverified data is preferably held prior to verification and only replaces the code stored in the NAM once verification has been obtained.

BRIEF DESCRIPTION OF THE DRAWINGS

The application will now be described in more detail with reference to Figures of the drawings of which.

DETAILED DESCRIPTION OF THE INVENTION

Figure 1:
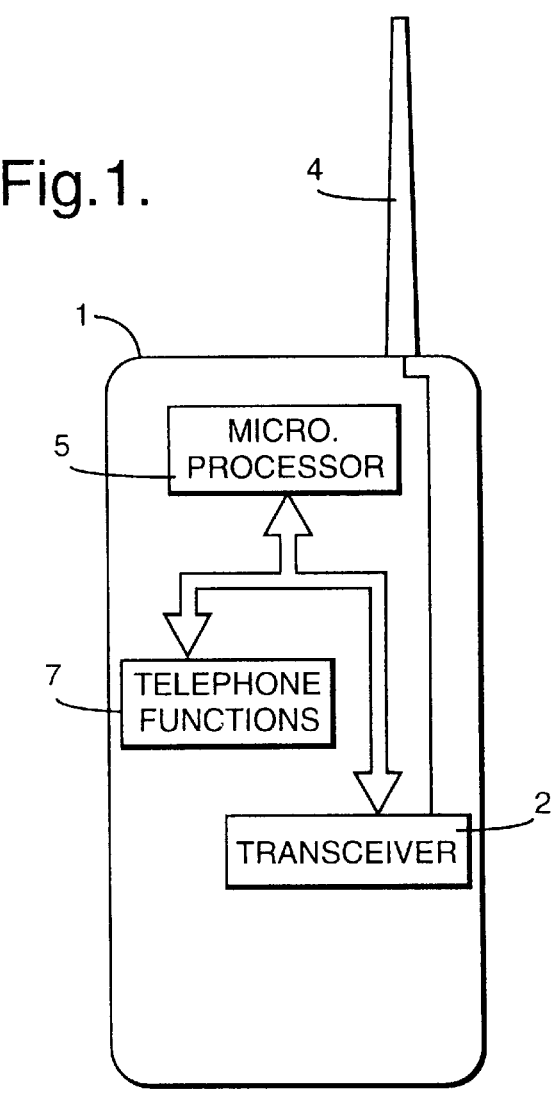
FIG. 1 is a schematic representation of a radio telephone of an embodiment of the present invention.
Figure 2:
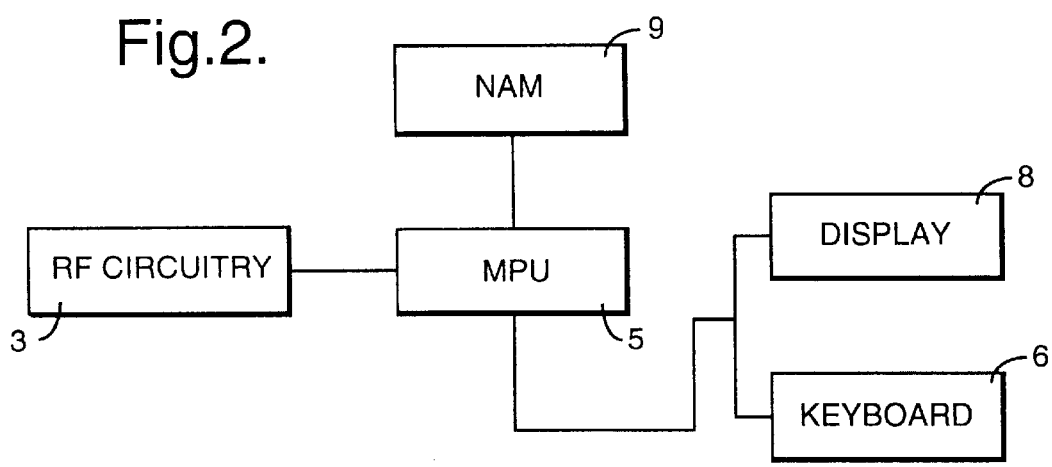
FIG. 2 is a schematic representation of a radio telephone of an embodiment of the present invention.

FIGS. 1 and 2 are schematic representations of a radio telephone 1. As is conventional, the radio telephone 1 includes a transceiver 2 including R.F. circuitry 3 (FIG. 1) connected to an external antenna 4 and coupled to a microprocessor unit (MPU) 5 that receives signals from a keyboard 6, controls telephone functions 7 and displays information on a display 8. The telephone 1 has its own inherent telephone number by virtue of a NAM 9 contained within the main unit of the radio telephone.

To use a radio telephone, it must first be powered up. Typically the information held in the NAM 9 is interrogated by the MPU 5 each time the radio telephone is powered up to determine the phone's unique identity. This embodiment of the present invention introduces a simple check during the start-up sequence to determine whether or not the presently held NAM data corresponds to the factory default NAM.

Figure 3:
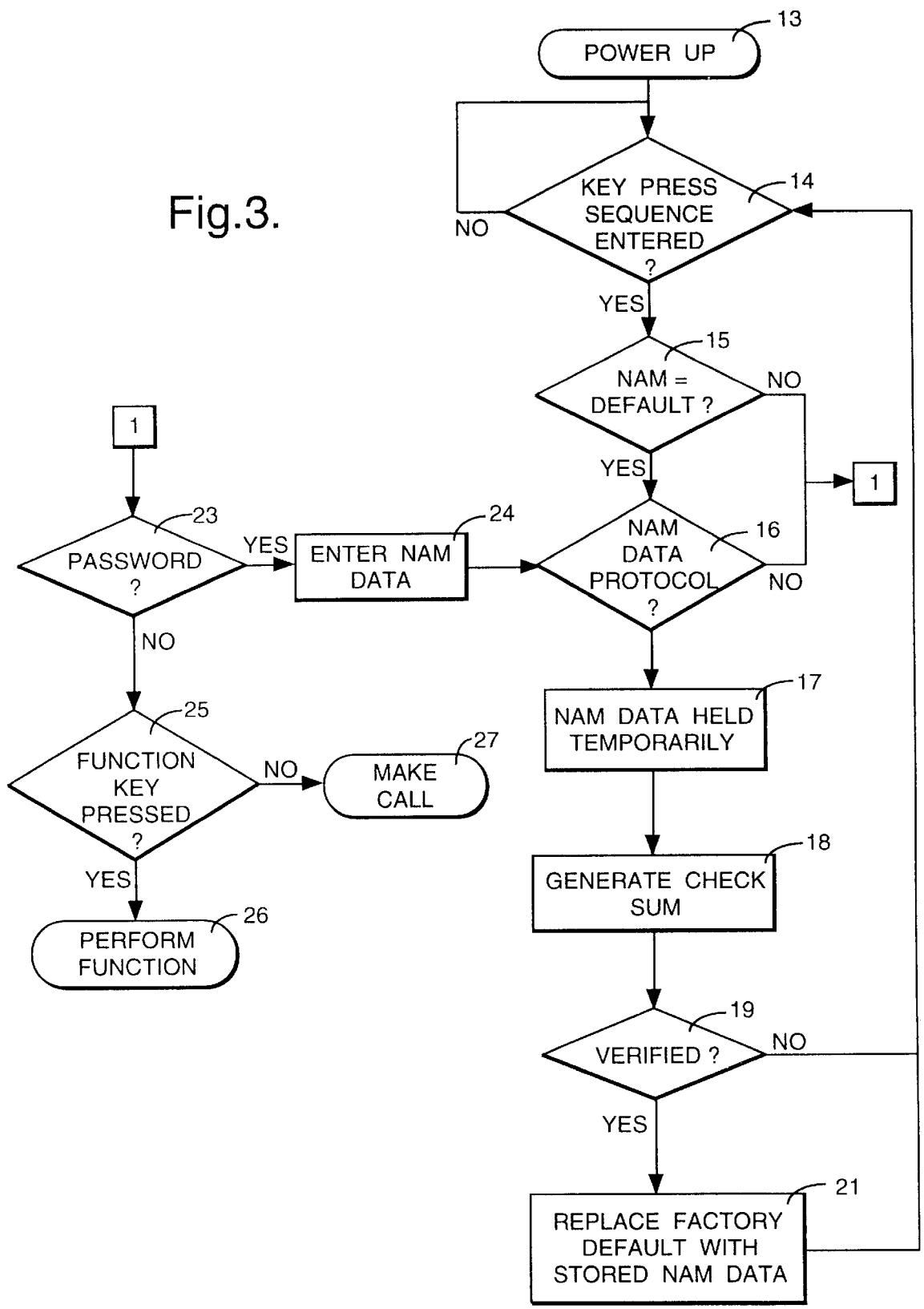
FIG. 3 is a flow chart showing a process for storing identification information in the NAM in accordance with an embodiment of the invention.

FIG. 3 is a schematic showing the process undertaken by the radio telephone when it is powered up and subsequently utilised. Once the NAM is powered up, (block 13) and a key stroke or key press sequence entered (block 14), the contents of the NAM, specifically the contents of the MIN field of the NAM is checked to see if still contains the factory default setting (block 15).

The key stroke sequence is then interrogated to see if it meets the protocol for entering the NAM data. In this specific embodiment the NAM is entered in two parts the MIN and the SID separated by an asterisk. Other protocols could, however, be adopted. If the NAM is still in its original condition checked at block 15 the incident key stroke sequence is checked to see if it complies with the protocol (block 16).

Once it has been established that the identification information (NAM data) is not stored in the NAM ie it still holds the factory default setting (block 15); and it has also been established that a sequence of key strokes has been entered that conforms to the NAM data protocol (block 16), the data input through the keyboard is assumed to be NAM data.

The NAM data is held for verification before replacing the default NAM setting (block 17). To verify the NAM data a check sum based on the numbers entered is generated (block 18). The manner in which the check sum is generated is not critical. Any function of the input numbers will provide an identifier that can be checked verbally with the service provider or perhaps verified over the air. The identifier may be a simple single digit number or could perhaps be some other identifying character or characters. The identifier is checked against a corresponding check sum provided by the service provider which has been derived using the same functional relationship from the numbers that should have been entered. If the two numbers correspond the likelihood is that the NAM data entry has been performed correctly and the data entered is verified (block 19). If there is a discrepancy between the two check sums, a mistake has been made and the data entry is not verified. This results in no action being taken (block 20) and the radio telephone reverts to normal operation (block 14).

If the data entry is verified, the factory default NAM is replaced with the entered data (block 21), the NAM no longer contains the factory default and the phone reverts to normal operation at (block 14).

If despite the check sum verification, the NAM data entered is not correct, the incorrect NAM data can still be replaced by entering a specific password that gives access to the NAM. As under these circumstances the factory default NAM will have been replaced and on entering the specific password the 'no' branch will be taken at block 15.

The key stroke sequence will be compared to the specific password at block 23 and, if it complies, the user can, or perhaps is prompted to, enter the NAM data (block 24). The process then returns to block 16 to check that the correct protocol has been followed for NAM data entry. The process then continues with blocks 17 to 19 until the correct information is stored in the NAM.

Once the unique identifying NAM information has been stored in the NAM, the process will always pass from block 15 to block 23. If a key stroke sequence is not the password (block 23), the key stroke sequence is investigated to determine if the user is requesting a function to be performed (block 25). If so the phone operates as it would when performing a function (block 26), otherwise, the phone operates as it would when making a telephone call (block 27).

If the factory default information is stored in the NAM, and the user, instead of trying to enter the NAM information is merely trying to make a call or perform a menu driven function, the process will pass from block 16 to block 23. The process described in the previous paragraph in relation to blocks 23 to 27 will then be repeated.

Figure 4:
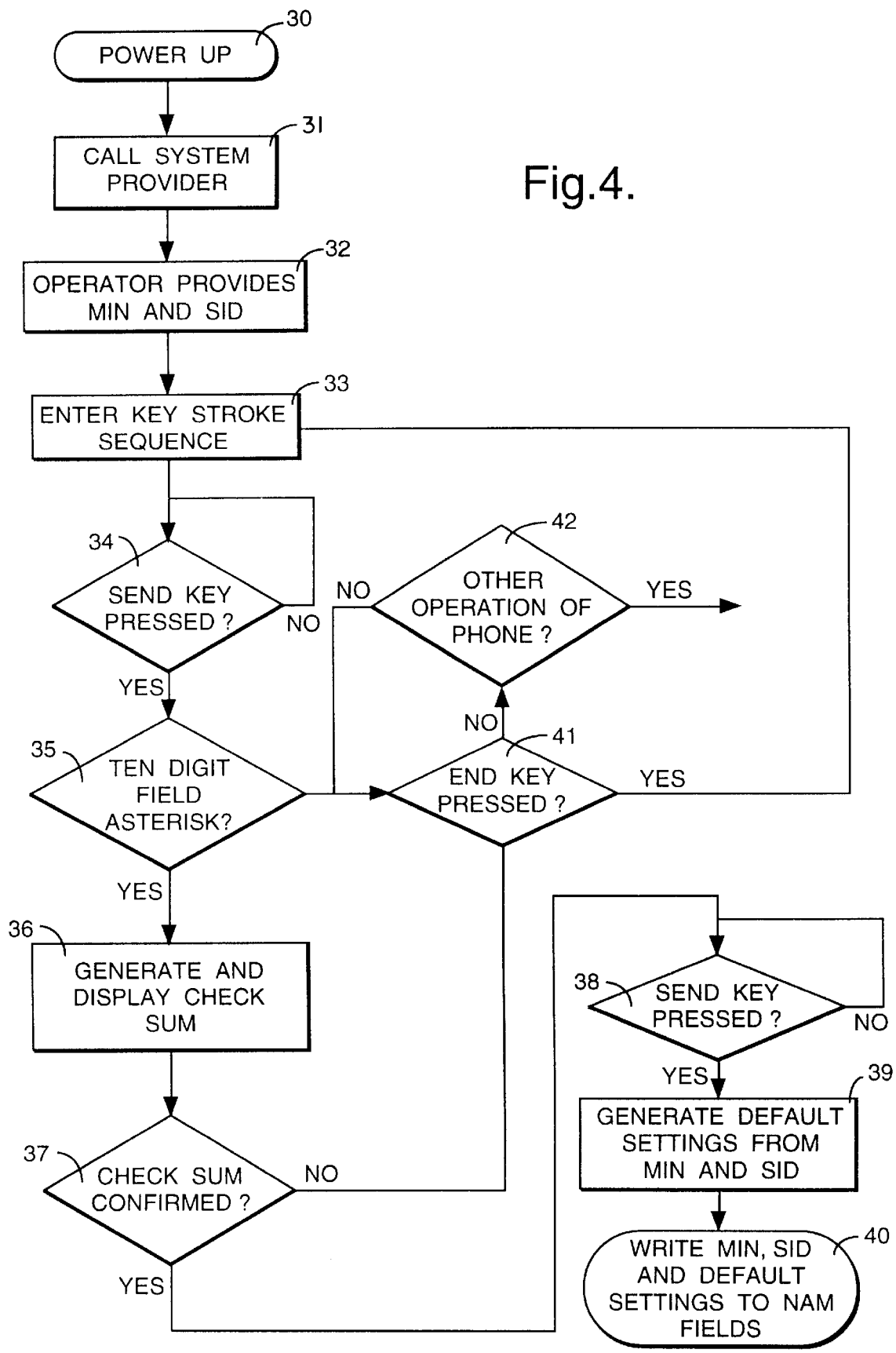
FIG. 4 is a flow chart showing user operation of the radio telephone during the process of FIG. 3.

The method of storing the NAM information in the NAM from the perspective of the user or sales assistant is described in greater detail with reference to FIG. 4.

The user will power up the telephone (block 30) for the first time and either use a landline telephone to call the service provider (block 31) or perhaps use the default NAM to make a call using the radio telephone. The service provider could, however, be contacted in other ways, for example, via computer. Once contacted the service provider provides the MIN and SID to the user (block 32) who inputs the figures provided (block 33) divided, in this specific embodiment, with an asterisk. This sequence is displayed on the LCD. The send key is then pressed (block 34). The MIN is ten digits and the SID five although the preceding zeros of the SID can be omitted in this embodiment. This arrangement ie ten digits followed by an asterisk is checked for at block 35. If the sequence of key strokes entered corresponds to the MIN and SID, a check sum is calculated (block 36)

based on the digits input at block 33. The check sum is displayed. The user can then verify with the service provider that the check sum is correct. This can be achieved simply by repeating the check sum and having it confirmed verbally (block 37). Other options are, however, envisaged. The send key is perhaps pressed once again and the check sum is sent over the air to the service provider and a verification signal is returned in the same fashion. Another option may be for the user to enter a check sum at the time of entering the NAM data. The check sum generated based on the entered digits could then be immediately compared to the entered check sum and the verification process and replacement automated.

Once the check sum has been confirmed the user or sales assistant can have confidence that the NAM data has been entered correctly and the send, or other suitable key or key sequence is pressed again (block 38). At this stage data for other areas of the NAM is generated from the MIN and SID (block 39). This information is stored in the NAM along with the MIN and SID entered through the keyboard and possibly other default settings (block 40). The information generated may include, for example, the access overload class or the system control channel. The manner in which the entered NAM data replaces the existing data or code in the NAM is open to choice. One possibility is for it to take place as soon as verification occurs. As another option, however, the verified NAM data could be stored at a specified location, for instance 00 of the abbreviated dialling memory and only transferred to the NAM on the next occasion the phone is powered up.

If at block 37 the check sum is not confirmed, the user can press the end key and return to normal operation of the phone at which point the NAM data can be reentered or some other function performed. At block 41 a check is made to see whether or not the end key has been pressed. If it has, the phone returns to normal operation. Otherwise the key stroke sequence is checked at block 42 to see if it performs another operation of the phone.

If at block 35 the key stroke sequence is determined not to be a ten digit field followed by an asterisk, the end key can be pressed to return to normal operation at block 42 or the desired operation of the phone is performed.

The radio telephone now has its own individual identity and can be used to make calls.

The embodiment described in effect provides a phone preconditioned to accept NAM data entered in accordance with a specific protocol.

The embodiment described requires minimal key strokes for entering the NAM data and as such requires some degree of knowledge on the part of the user before the NAM information can be stored in the NAM. In order to make the process more simple so that the purchasers could perhaps enter the data themselves, the phone could prompt the user to input NAM data on detecting the factory default NAM each time the phone is powered up. This prompt would not be necessary once the factory default NAM had been replaced and could then be abandoned. Additional messages could be provided on the phone's display to prompt the next stage of the procedure.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention. In particular the invention is not restricted to any particular type of radio telephone. It is equally applicable to hand portable, mobile and transportable phones.

What is claimed is:

1. A radio telephone comprising:
   a Number Assignment Module (NAM) in which is stored a predetermined code at a predetermined location;
   means for determining if the predetermined code is stored at the predetermined location, said determining means operating in response to entering a sequence of key strokes; and
   replacing means responsive to the means for determining finding that the predetermined code is stored at the predetermined location for replacing the predetermined code with radio telephone identification data entered with the sequence of key strokes.

2. A radio telephone according to claim 1 wherein the replacing means comprises means for determining if the sequence of key strokes is indicative of the identification data.

3. A radio telephone according to claim 2 further comprising means for verifying the accuracy of the sequence of key strokes.

4. A radio telephone according to claim 3 wherein the means for verifying comprises means for generating at least one check character derived from the sequence of key strokes.

5. A radio telephone according to claim 4 wherein the at least one check character is displayed on a display of the radio telephone.

6. A radio telephone according to claim 4 further comprising means for sending a signal indicative of the at least one check character over the air for verification.

7. A radio telephone according to claim 2 wherein the predetermined location is adapted to receive a Mobile Identification Number (MIN) that is entered using the sequence of key strokes.

8. A method for storing identification data in a Number Assignment Module (NAM) for a radio telephone comprising the steps:
   storing a predetermined code at a predetermined location in the NAM;
   entering a sequence of key strokes;
   in response to the entered sequence of keystrokes, determining if the predetermined code is stored at the predetermined NAM location; and
   replacing the predetermined code with entered radio telephone identification data conditional on the result of the determination such that the predetermined code is replaced only if it is determined that the predetermined code is stored at the predetermined location, the entered sequence of keystrokes including the entered radio telephone identification data.

9. A method according to claim 8 wherein the step of replacing the predetermined code comprises the step of entering the sequence of key strokes, the entered sequence of key strokes being indicative of NAM data.

10. A method according to claim 9 wherein the step of replacing comprises a step of determining if the entered sequence of key strokes is indicative of the NAM data.

11. A method according to claim 9 wherein the step of replacing is additionally conditional on determining if the entered sequence of key strokes is indicative of the NAM data.

12. A method according to claim 8 wherein the step of replacing comprises a step of verifying the accuracy of the entered radio telephone identification data.

13. A method according to claim 12 wherein the step of verifying comprises a step of generating at least one check character derived from the sequence of key strokes that are indicative of identification data.

14. A method according to claim 13 wherein the step of verifying comprises a step of displaying the at least one check character.

15. A method according to claim 13 wherein the step of verifying comprises a step of sending a signal indicative of the at least one check character over the air for verification.

16. A method according to claim 8 wherein the entered radio telephone identification data is indicative of a Mobile Identification Number (MIN) and a System Identification Number (SID).

17. A method according to claim 16 and further comprising steps of deriving additional identification data from at least one of the MIN and SID and storing the derived additional information in the NAM.

18. A method according to claim 12 wherein after the step of verifying a predetermined signal is provided to initiate replacement of the predetermined code with the entered identification data only if the entered identification data is determined to be accurate.

19. A method according to claim 8 wherein if the identification data is stored in the NAM another, predetermined, sequence of key strokes provides access to the NAM for replacing the stored identification data.

20. A radio telephone comprising:

a Number Assignment Module (NAM) in which is stored a predetermined code at a predetermined location;

means, responsive to a user entering information through a user interface, for determining if the predetermined code is stored at the predetermined location; and replacing means, responsive to the determining means determining that the predetermined code is stored at the predetermined location, for verifying that the information entered by the user is comprised of valid radio telephone identification data and, if the information is verified to be valid radio telephone identification data, for replacing the predetermined code with the entered radio telephone identification data.

* * * * *